Nov. 7, 1950 J. FLECK 2,529,248
CONTAINER COVER AND HINGE
Filed April 3, 1946
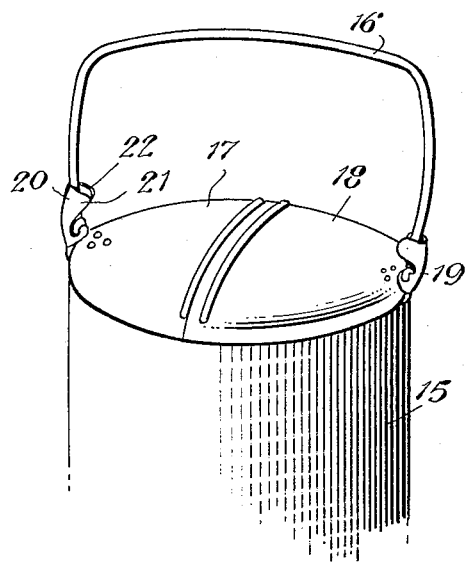
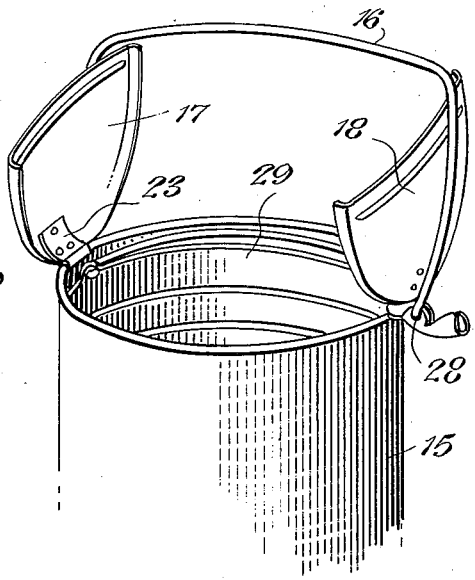
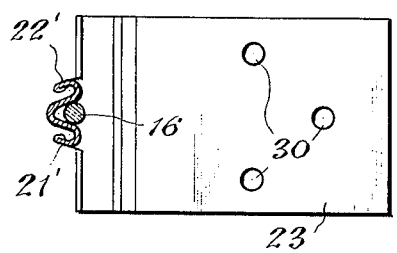
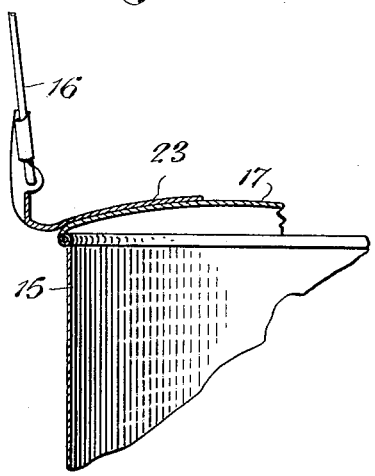
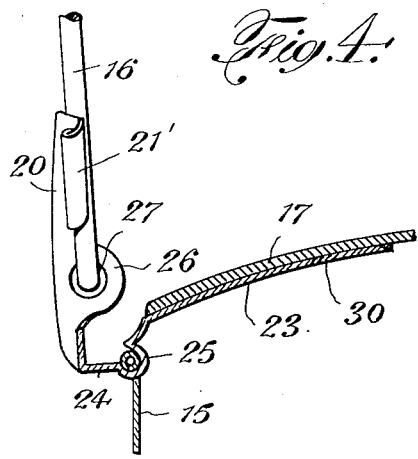
INVENTOR
JOSEPH FLECK
BY
Emery Varney, Whittemore & Dix
ATTORNEY Patented Nov. 7, 1950

2,529,248

UNITED STATES PATENT OFFICE 2,529,248

CONTAINER COVER AND HINGE

Joseph Fleck, Asbury Park, N. J.

Application April 3, 1946, Serial No. 659,194

2 Claims. (Cl. 220—36)

This invention relates to an improved type of cover arrangement for a container, and has for one of its main features an improved cooperation between the handle and the cover whereby the handle is positively maintained in a substantially upright position where it is easily and quickly grasped when the cover is closed, and upon pushing the handle downward the cover opens and the handle may move or be moved out of its upright position for a limited travel to allow articles to be put into or taken out of the container without the handle being in an obstructing position.

In containers designed for many purposes, the handle normally is down at the side of the container, except when carrying, and any cover for the container must be moved by a separate movement to open or close the container.

There are many instances where the uses and value of the container may be greatly increased if there is automatic cooperation between the container proper, the cover therefor and the handle therefor.

Another of the features of this invention is to provide an improved construction of a container and its handle and its cover whereby novel cooperation is obtained to make it more convenient and easy to open the cover automatically and to have the handle in a position to grasp easily and quickly, and usually at a position above the top of the container. This improved cooperation between the elements also causes the cover to be firmly held in closed position when the container is being carried by the handle.

Other advantages of the invention, its apparatus and functioning will be noted in the following detailed description.

In the drawing,

Fig. 1 is a perspective view showing the cover of a container in closed position and a handle held upright.

Fig. 2 is a perspective view of the same apparatus with the cover open and the handle engaging one part of the cover.

Fig. 3 is a view of a portion of a clip hinge showing in section portions of the handle and the hinge.

Fig. 4 is a side view of the clip hinge and its association with a portion of the cover and a portion of the handle, and Fig. 5 is a modified form of the clip hinge fastened to the cover which in turn is pivoted on the container.

Referring now to the drawings, a container 15 is provided with a handle 16 and a cover, which in the preferred form, is composed of two parts 17 and 18. A suitable means for association of the cover with the handle is here shown as a clip hinge 19.

The preferred construction and association of the elements show the clip hinge being pivoted to the top portion or rim of the container and as also engaging the handle. It is to be understood that the cover may be pivoted to the container and the clip hinge fastened directly to the cover as shown in Fig. 5 of the drawing.

One of the special features of this invention is to have the handle of the container positively maintained in a substantially upright position when the cover is closed over the container thereby having the handle within easy reach and so that the cover may be opened quickly and easily. One form of apparatus to accomplish this purpose is to have the improved clip hinge engage the handle when the cover is closed to maintain the handle in substantially upright position. While obtaining this result, it is also desirable to construct that portion of the clip hinge which engages the handle so that it will move out of that engagement when the cover is moved to its open position. This relation of parts is shown at the right hand side of Fig. 2.

It is desired to have the handle engage the clip hinge in any suitable manner in order to carry out the cooperation between the parts. In the preferred form herein the engagement is loose. With the handle 16 fastened to clip 19 in loose attachment or arrangement as indicated in Figs. 1, 2 and 4, the handle would normally tend to drop to one side as the cover is raised and the supporting part of the clip moves out of engagement with the handle. In order to prevent the handle from dropping to the side of the container, it is designed so as to engage the edge of at least one of the parts of the cover as shown in Fig. 2. Other suitable means may be employed for allowing the handle to have limited movement from its vertical position toward the side of the container in order to place articles in the container or to withdraw them therefrom without the handle being in an obstructing position.

In the preferred form of clip hinge, it is desired to provide an upward extending portion 20 of the clip 19 and to bend it into substantially U-shape, thereby providing ears 21 and 22 for engaging the handle and supporting or maintaining it in substantially upright position when the cover is closed.

While the cover in the preferred form herein is shown in two parts, 17 and 18, and the handle extends across the container and engages two clip hinges 19, it is to be understood that a single cover and only one hinge clip may be employed. In such a case a shortened length of the handle would be provided which would not necessarily extend across the full width of the container. In such a modified construction the ears 21 and 22 would frictionally engage a shortened handle 16 as the handle passes into the back of the U-shaped portion 20 thereby preventing the handle from dropping out and onto the cover. The ears 20 and 21 would still maintain the shortened handle in substantially upright position.

The preferred form of clip hinge is shown in Figs. 3 and 4 in which an inwardly extending arm 23 receives and firmly holds the cover portion 17. The clip hinge has a portion 24 extending from the other side of a pivot portion 25 that engages the top rim of the container 15. The hinge clip in this preferred form is then extended upwardly to provide the portion 20 with modified types of ears 21' and 22' shown particularly in cross section in Fig. 3.

In joining the handle 16 and clip hinge 19 together in their loose relation, any type of structure may be employed. In the preferred form illustrated here, an eye 26 is formed in the clip hinge forming a hole 27 which engages the turned up portion 28 of the handle 16. With particular attention to Fig. 4, it will be noted that the eye 26 is formed in the clip hinge so that a plane passing vertically through the opening 27 will be at the left of pivot point 25, thereby being in a vertical plane which lies outside the container. With this type of construction it will be seen that the downward push on the handle 16 will cause the cover portion 17 to rise about pivot 25, and will also cause the ears 21 and 22 to move out of engagement with the handle while the cover parts will rise and open the container as shown in Fig. 2.

A modified form of the elements of this apparatus which will give substantially the same cooperation is shown in Fig. 5, in which the cover part 17 is shown as being pivoted directly on the container 15 and the clip arm 23 being attached to the cover on the outside thereof instead of underneath as shown in Figs. 2 and 4. With this modified construction the handle and hinge clip are readily attached to containers which already have a cover pivoted to it. The extending arm 23 of the hinge clip may be easily attached to the cover 17 by passing rivets through holes 30 provided in the extended arm.

When the cover is made in two sections as noted at 17 and 18, then the handle 16 extends across the container and two clip hinges are provided and when the cover parts are open, the handle will engage the top edges of each cover part. The size and weights of the cover parts, handle and clip hinges may be varied so that there is a good balancing of them on their hinge points and thus allow easy opening and closing of the cover portions and the movement of the handle. In carrying out the construction and function of the preferred form, it is desired to have the center of gravity of each of the cover parts 17 and 18 fall beyond, or outside of, the pivot points 25 so that the cover parts will stay open until the handle is lifted upward causing the parts to move to positions where they will drop to the top of the container by their own weights.

The preferred construction herein provides for the cover parts to be pivoted upwardly. If desired, they may be pivoted to move horizontally and in that case the handle when the covers are moved to open positions, would not fall to the side of the container but would engage at least one of the cover parts.

The description of the cooperating elements of the handle and cover and clip hinge are herein shown in their preferred form as covering a container 15. The purpose and use of the container is not to be limited by the disclosure herein. For instance, the container may be a suitable waste can with an inside pail 29 as illustrated in Fig. 2, which is particularly usable in hospitals, doctors' offices and the like. The apparatus may however be adapted for many other uses such, for instance, as covers for hot plates or for containers in steam tables and other cooking apparatus. The improved cover apparatus may also be placed over the end of a pipe, or it may be used simply to cover a glass plate having a rim around it and a particular document of historical value placed under the glass. There may be many uses of this type of cover and cooperating handle for readily opening and closing the tops of containers of any nature.

While the invention has been herein disclosed as embodied in a particular preferred form, it is to be understood that modifications may be made, but the functions and cooperations of elements in such modifications are considered to be within the scope of this invention as outlined in the following claims.

I claim:

1. In combination, a container, a two-part cover for closing the top of said container, clip hinges fastened to said cover parts and being pivoted to the top edge of said container and extending outwardly and upwardly, a handle having its ends loosely fastened in the upwardly extending portions of said clip hinges, each of said clip hinges having U-shaped portions above the points of receiving the ends of said handle for engaging said handle to maintain the same substantially upright when said cover parts are closed over said container, said U-shaped portions moving out of engagement with said handle as said handle is pushed downwardly to cause the cover parts to pivot upwardly thereby opening said container, said cover parts when pivoted upwardly engaging said handle after being moved out of its upright position but before it falls to the level of the top of the container.

2. In combination, a container, a two-part cover for closing the top of said container, clip hinges fastened to said cover parts and being pivoted to the top edge of said container and extending outwardly and upwardly, a handle having its ends loosely fastened in the upwardly extending portions of said clip hinges, said points of attachment of the ends of said handle being in vertical planes falling outside of the pivot points of said hinges on said container, each of said clip hinges having U-shaped portions above the points of receiving the ends of said handle for engaging said handle to maintain the same substantially upright when said cover parts are closed over said container, said U-shaped portions moving out of engagement with said handle as said handle is pushed downwardly to cause the cover parts to pivot upwardly thereby opening said container, said cover parts when pivoted upwardly engage said handle after being moved out of its upright position but before it falls to the level of the top of the container.

JOSEPH FLECK.

REFERENCES CITED

The following references are of record in the file of this patent:

UNITED STATES PATENTS

| Number | Name | Date |
|---|---|---|
| 489,173 | Wilmot | Jan. 3, 1893 |
| 1,351,201 | Carland | Aug. 31, 1920 |
| 1,639,093 | Kircher | Aug. 16, 1927 |
| 1,696,567 | Currie | Dec. 25, 1928 |
| 1,822,519 | Fleck | Sept. 8, 1931 |